United States Patent
Steingraber et al.

(10) Patent No.: US 6,981,468 B1
(45) Date of Patent: Jan. 3, 2006

(54) MILKING CLAW BOTTOM

(75) Inventors: Gary C. Steingraber, Madison, WI (US); Paul D. Thompson, Madison, WI (US)

(73) Assignee: Bou-Matic Technologies Corp., Madison, WI (US)

( * ) Notice: Subject to any disclaimer, the term of this patent is extended or adjusted under 35 U.S.C. 154(b) by 0 days.

(21) Appl. No.: 10/828,432

(22) Filed: Apr. 20, 2004

(51) Int. Cl.
*A01J 5/00* (2006.01)

(52) U.S. Cl. .................................. 119/14.54; 119/14.55
(58) Field of Classification Search .............. 119/14.54, 119/14.55, 14.37, 14.41, 14.51
See application file for complete search history.

(56) References Cited

U.S. PATENT DOCUMENTS

| | | |
|---|---|---|
| 4,253,419 A | 3/1981 | Yang |
| 4,537,152 A | 8/1985 | Thompson |
| 4,941,433 A | 7/1990 | Hanauer |
| 5,076,211 A | 12/1991 | Tonelli |
| 5,080,041 A | 1/1992 | Steingraber |
| 5,291,853 A | 3/1994 | Steingraber et al. |
| 5,345,890 A * | 9/1994 | Petersson et al. ........ 119/14.54 |
| 5,586,518 A | 12/1996 | Carrano |
| 6,298,807 B1 | 10/2001 | Terwilleger |
| 6,543,382 B1 | 4/2003 | Kolstad et al. |
| 2002/0156589 A1 * | 10/2002 | Fematt ........................ 702/45 |
| 2004/0060520 A1 * | 4/2004 | Sellner et al. ........... 119/14.54 |

* cited by examiner

*Primary Examiner*—Yvonne R. Abbott
(74) *Attorney, Agent, or Firm*—Andrus, Sceales, Starke & Sawall, LLP

(57) ABSTRACT

A milking claw for a dairy animal has a bottom having an outlet tubular member having a flow passage of a first vertical height, and a nozzle having an opening passing milk therethrough from the claw bottom to the flow passage. The nozzle opening has a second vertical height less than the first vertical height, such that milk level in the claw bottom need only rise to the level of the second lower vertical height of the nozzle opening rather than to the level of the first higher vertical height of the flow passage of the outlet tubular member, to provide a pressure differential between the vacuum in the outlet and the vacuum in the claw, whereby to draw milk from the claw in smaller more frequent slugs as compared to higher volume less frequent slugs while otherwise waiting for milk level in the claw bottom to rise to the level of the first vertical height.

38 Claims, 10 Drawing Sheets

MILKING CLAW BOTTOM

BACKGROUND AND SUMMARY

The invention relates to dairy equipment, and more particularly to milking claws.

A milking claw is part of a milking cluster which is an assembly attached to the dairy animal's udder during milking. The cluster includes the claw, four shell assemblies, four short milk tubes, four air tubes, and an air fork, for example as shown in U.S. Pat. No. 5,586,518, incorporated herein by reference. Each shell assembly includes an outer shell or teat cup, and an elastic inner liner called a teat cup liner or inflation. The short milk tube connects the teat cup shell assembly to the claw which in turn is connected to a milk transport hose subject to vacuum or negative pressure. The air tube connects the space between the teat cup liner and the shell to the air fork. The air fork is connected through one or more air lines to a pulsation device cycling vacuum off and on.

When milking a dairy animal, the inside bore of the teat cup liner is at the system vacuum level, and the space between the teat cup liner and the shell is either at vacuum or at atmospheric pressure, depending on the cycle of the pulsation device. When there is atmospheric pressure on the outside of the liner in the space between the liner and the shell, the vacuum on the inside of the liner causes the liner to collapse. This is known as the rest phase, during which there is no milk flow, i.e. the liner is closed. When there is vacuum on the outside of the liner in the space between the liner and the shell, such vacuum balances the vacuum on the inside of the liner, and the liner can relax or expand. This is the milk phase, during which milk flows, i.e. the liner is open. Most milking clusters operate efficiently with pulsation rates between 45 and 60 cycles per minute. The pulsing movement of the liner massages the teat. In the rest phase, the collapse of the liner squeezes the teat, forcing blood in the teat to circulate. Without this rest phase, blood would not circulate throughout the teat, and injury to the teat might result. Milk from the four teat cup assemblies flows into the milking claw, and then through the claw outlet to a collection facility, as is known.

The present invention relates to an improved milking claw, including an improved claw bottom.

BRIEF DESCRIPTION OF THE DRAWINGS

Prior Art

FIG. 1 is a perspective view of a milking claw known in the prior art.

FIG. 2 is an exploded perspective view of the milking claw of FIG. 1.

FIG. 3 is a top elevation view of the milking claw of FIG. 1.

FIG. 4 is a sectional view taken along line 4—4 of FIG. 3.

FIG. 5 is a top elevation view of the interior of the lower bowl of FIG. 2.

FIG. 6 is a side view of a milking cluster, including a milking claw, attached to a dairy animal.

FIG. 7 is an enlarged view of a portion of FIG. 6.

Present Invention

Figure 8:
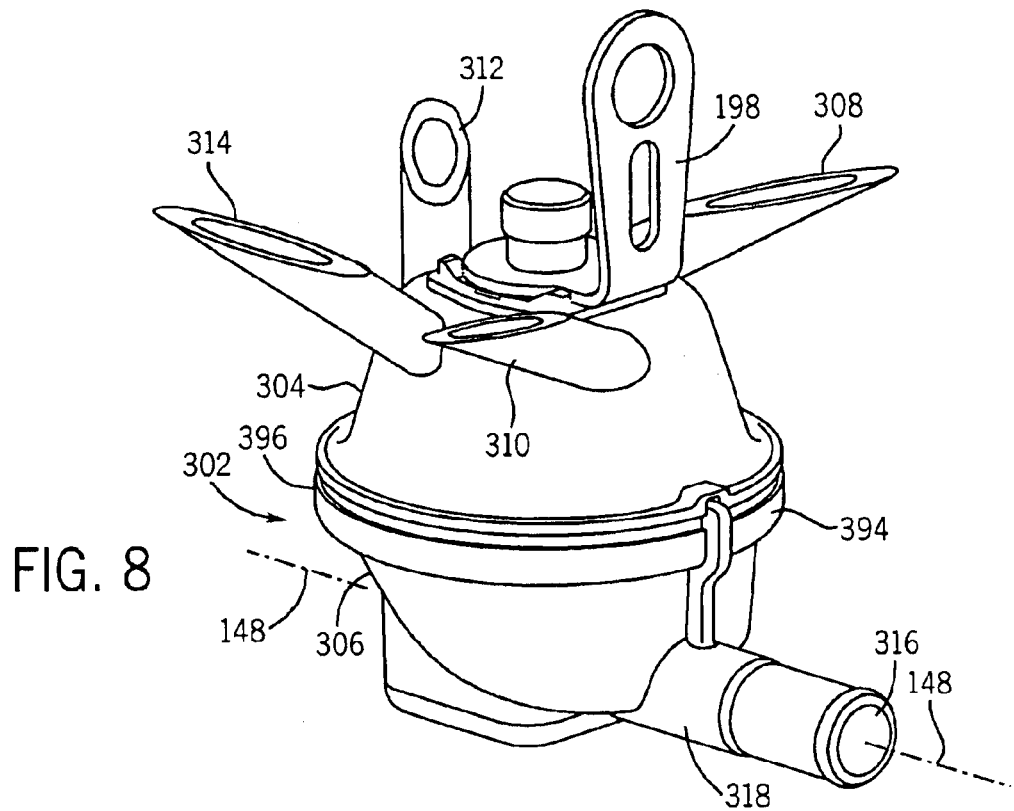

FIG. 8 is a perspective view of a milking claw in accordance with the present invention.

Figure 9:
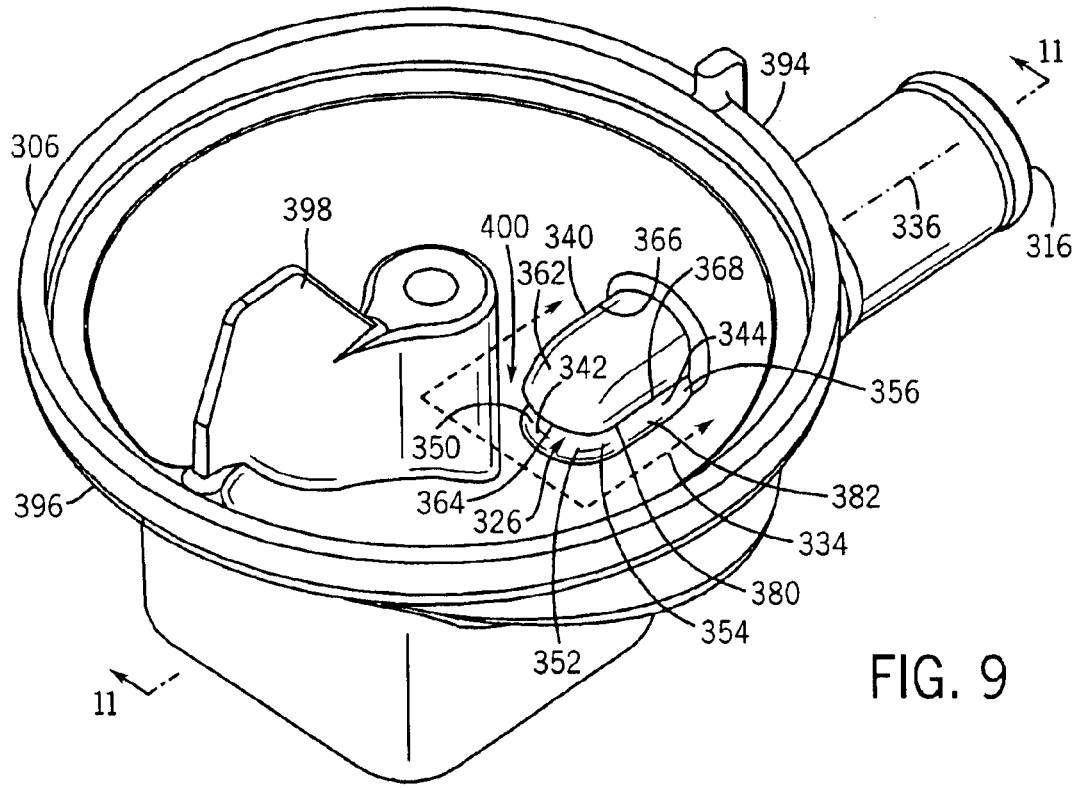

FIG. 9 is a perspective view from above of the interior surface of the claw bottom of FIG. 8.

Figure 10:
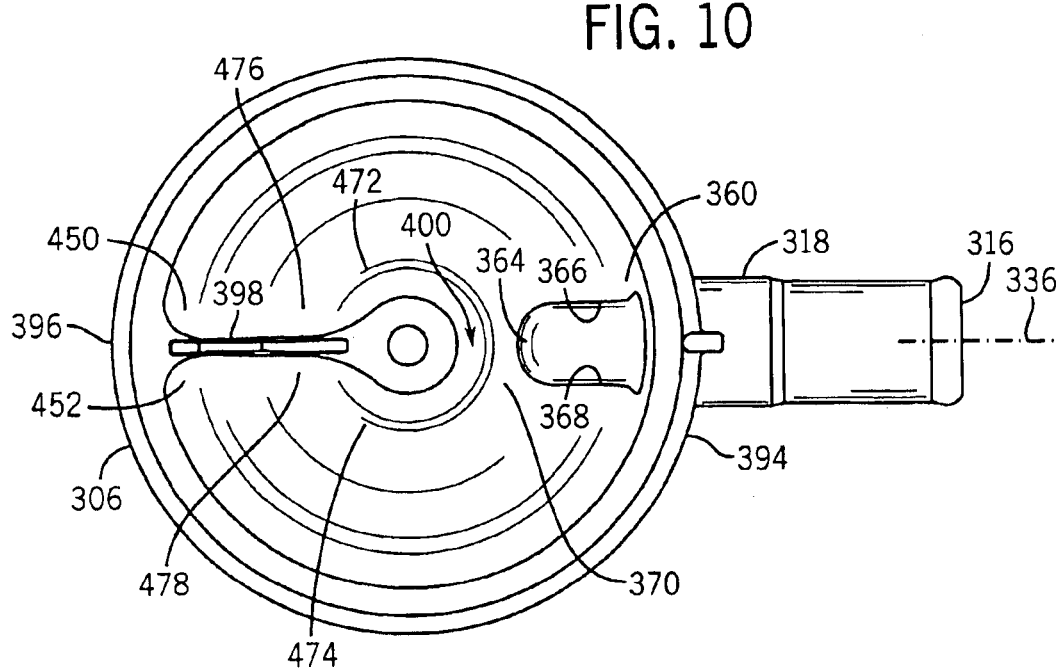

FIG. 10 is an elevation view from above of the interior surface of the claw bottom of FIG. 9.

Figure 11:
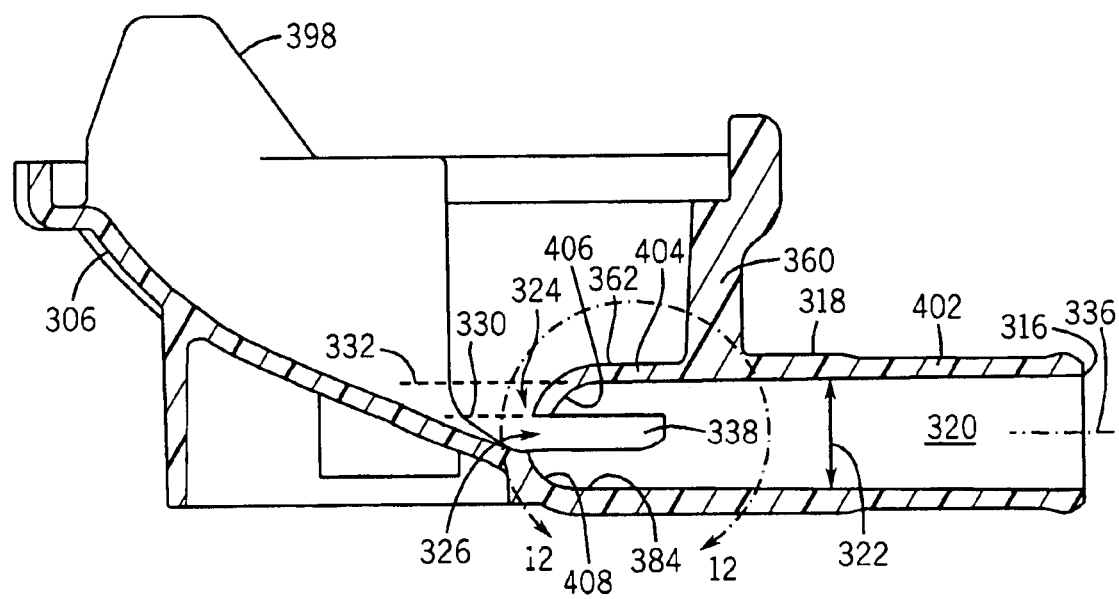

FIG. 11 is a sectional view taken along line 11—11 of FIG. 9.

Figure 12:
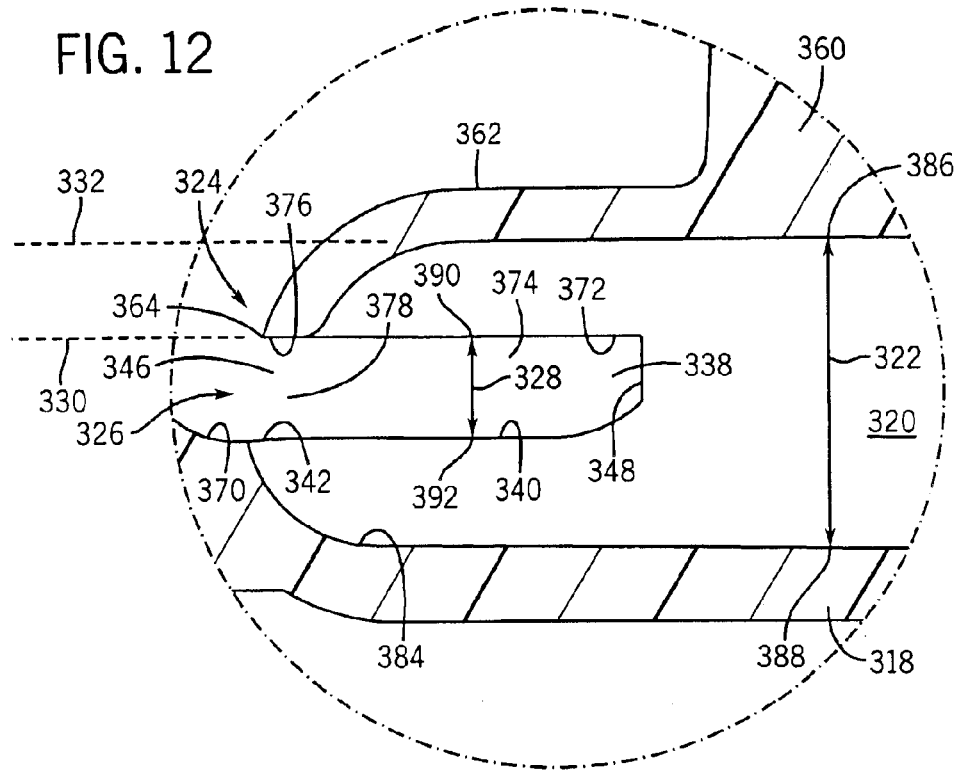

FIG. 12 is an enlarged view of a portion of FIG. 11.

Figure 13:
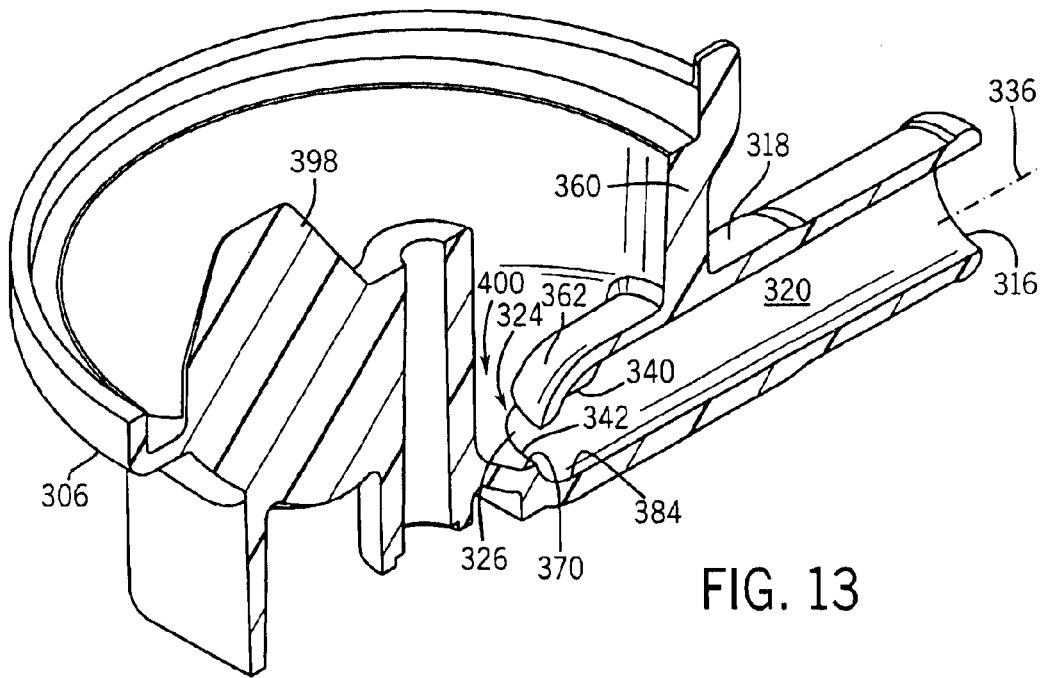

FIG. 13 is a perspective view partially cut away of the claw bottom of FIG. 9.

Figure 14:
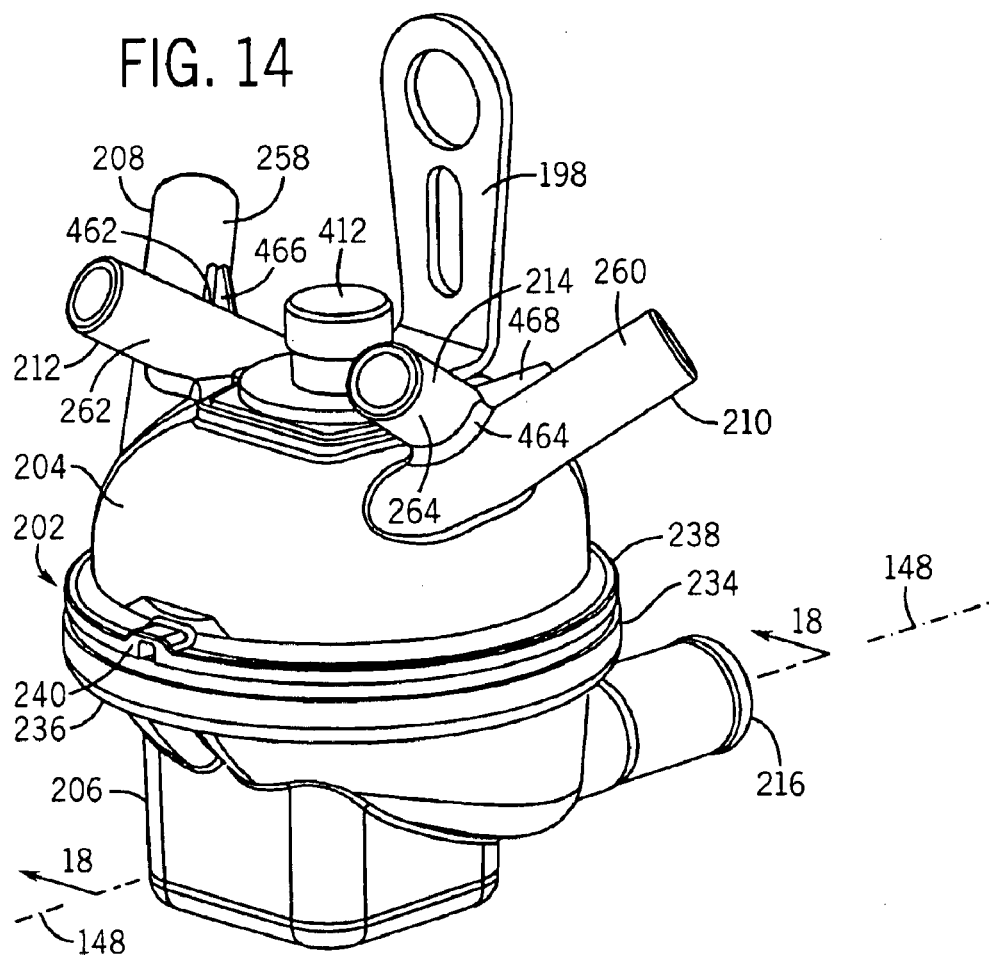

FIG. 14 is a perspective view of a further embodiment of a milking claw in accordance with the invention, including in combination with a novel claw top which is the subject of commonly owned copending U.S. patent application Ser. No. 10/828,425, filed on even date herewith.

Figure 15:
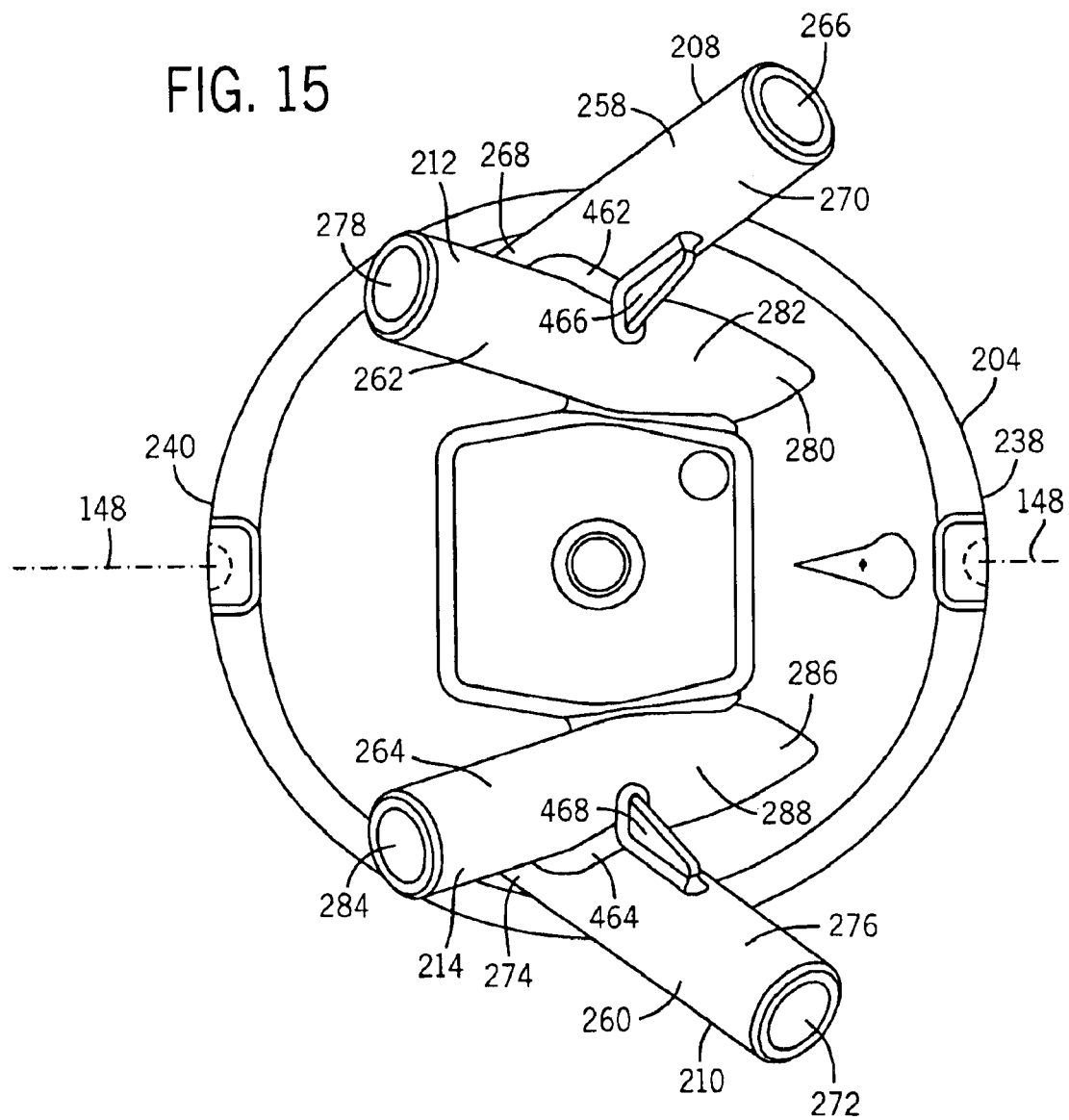

FIG. 15 is an elevation view from above of the claw top of FIG. 14.

Figure 16:
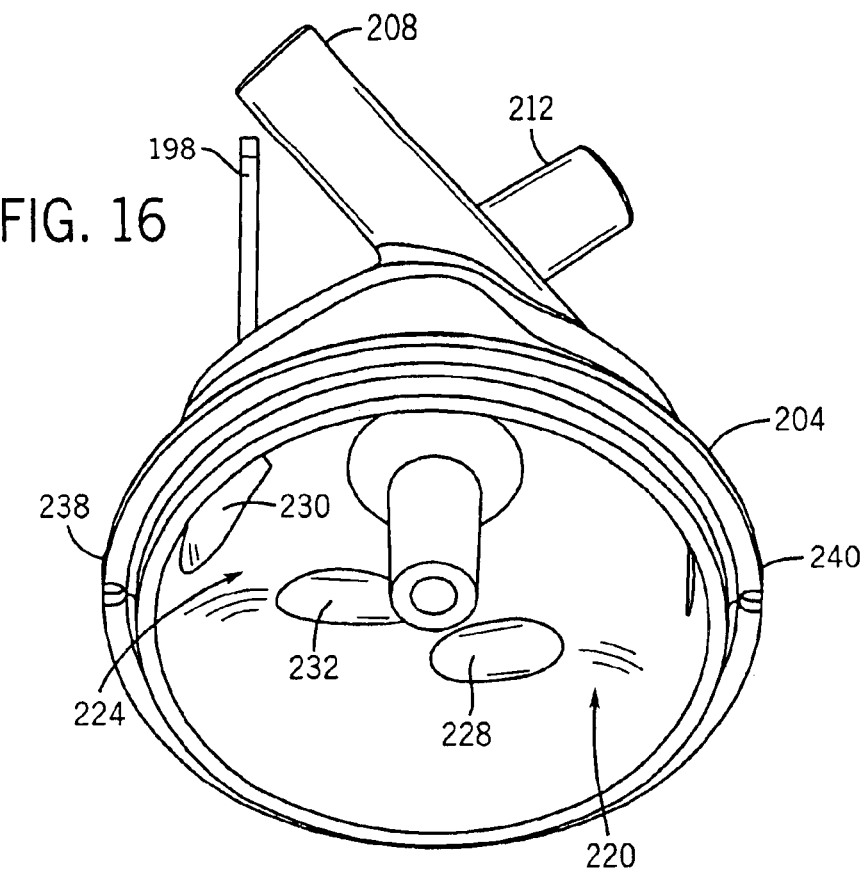

FIG. 16 is a perspective view from below of the interior surface of the claw top of FIG. 15.

Figure 17:
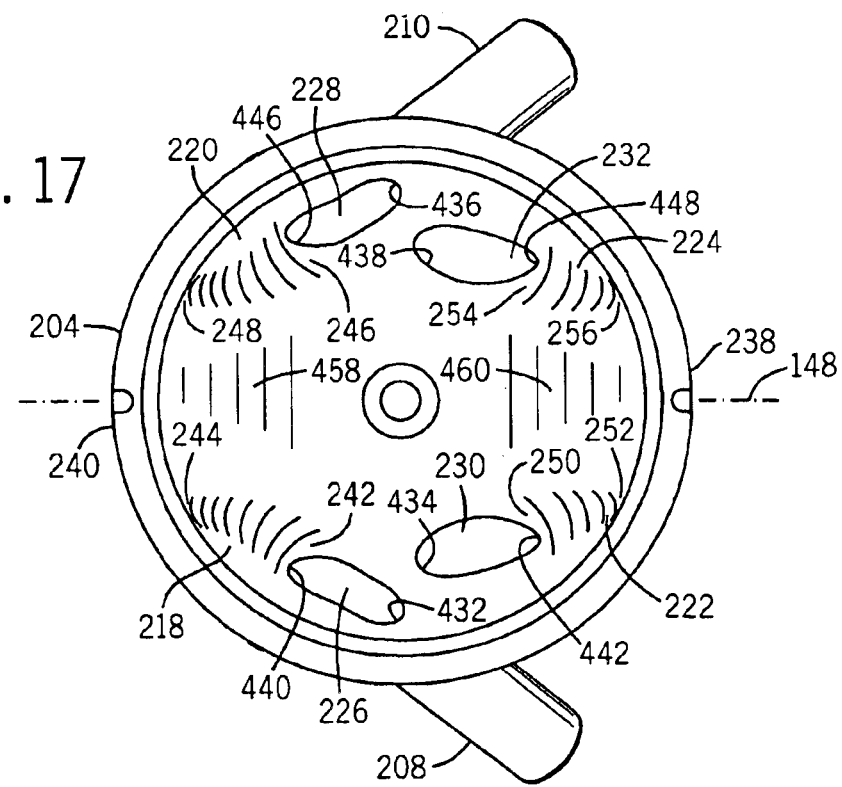

FIG. 17 is an elevation view from below of the interior surface of the claw top of FIG. 16.

Figure 18:
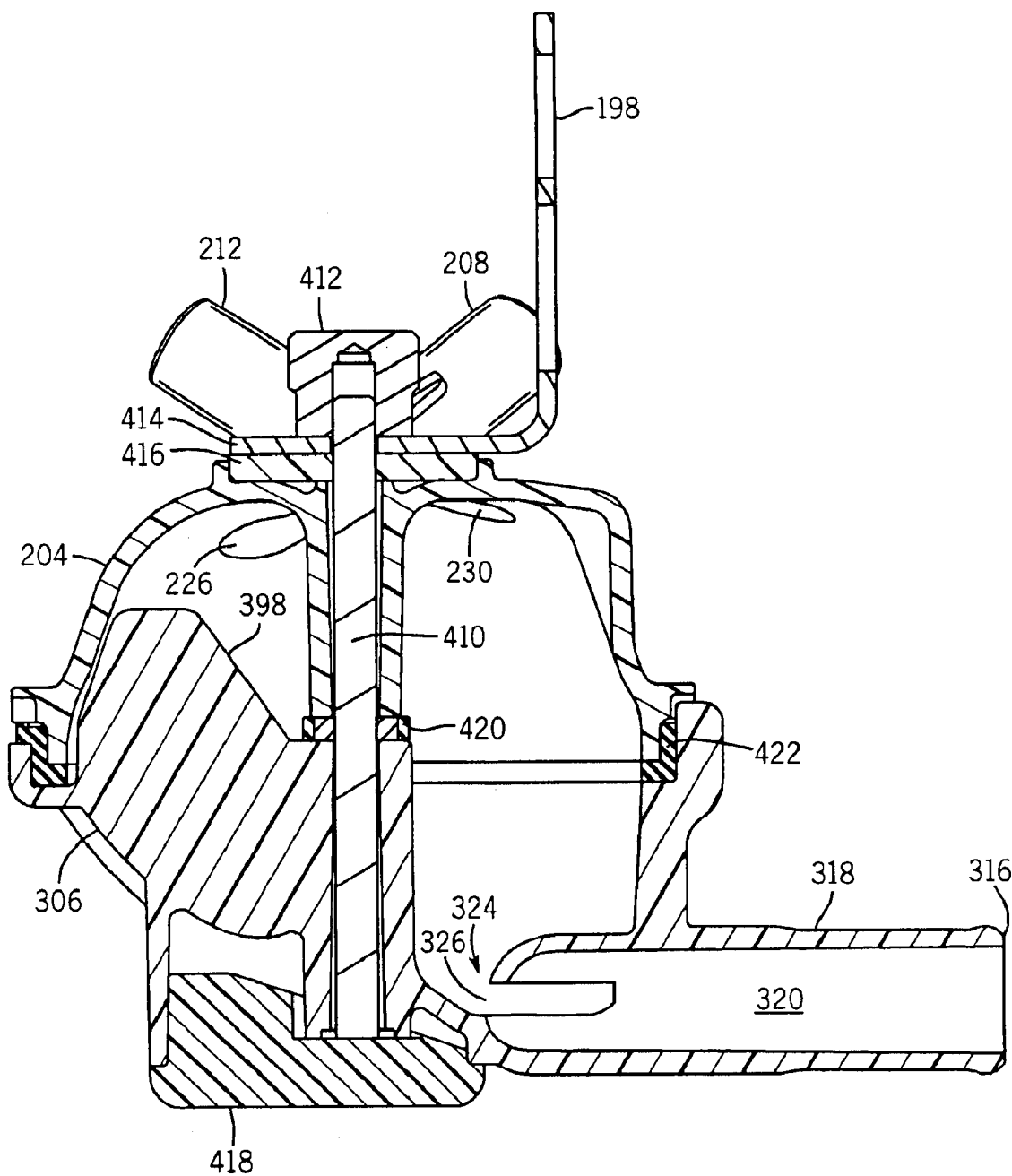

FIG. 18 is a sectional view taken along line 18—18 of FIG. 14.

DETAILED DESCRIPTION

Prior Art

The following description of FIGS. 1–5 is taken from incorporated U.S. Pat. No. 4,537,152.

The milking claw 10 includes a bowl 12 and a cover 14 which has the general shape of a frustrum of a cone with the large diameter of the frustrum being connected to the bowl with the gasket 16 interposed between the bottom 18 of the cover and the internal seat 20 provided at the top of the bowl. The gasket 16 has an inturned lip which lies between the cover and the bowl and is compressed as the connector 22 is tightened. It will be noted the connector has a threaded end 24 which extends through the central boss 25 of the cover and threads into a threaded sleeve 26 fixed in the central boss 28 in the bowl with gasket 27 captured between boss 25 and boss 28. The upper end of the connector 22 is provided with a washer 30 welded to the connector to overlie the loose washer 32 and gasket 34 so as to compress the gasket 34 against the top of the frusto-conical cover 14 when the connector is tightened. The upper end of the connector is shaped to provide a hanging eye 36.

The upper portion of the frusto-conical cover 14 is provided with four inlet nipples 38, 40, 42, 44. Each nipple is generally tangential to the wall of the cover 14 and is downwardly inclined. With this arrangement, milk entering the nipples will be started downwardly on a path hugging the wall of the frusto-conical cover and cause the milk to swirl about the axis of the cover and bowl rather than dropping into the bowl and foaming. This swirling action in a downward and radially expanding path, coupled with the downward spiral of increasing cross-section in the bowl 12, virtually precludes the possibility of milk being blown back into a nipple other than the one from which the milk came.

It will be noted that the inlet 44 is above and in the same vertical plane as the center of the discharge fitting or outlet 46 leading radially out of the bowl. The outlet leads from the low point in the bowl.

It will be noted that the inlet nipples 38, 40 are closer to each other than they are to inlet nipples 42, 44. As a matter of fact, the inlets intersect the frusto-conical cover generally in a rectangular arrangement as can be seen in dotted lines in FIG. 3. This generally rectangular configuration accommodates the natural arrangement of a cow's teats. They are not arranged in a square pattern, but they are, instead, in a rectangular pattern. This, therefore, permits the hoses connecting the teat cups to the inlets to the milking claw to be of equal length to assure equal weight on each of the four teats of the cow rather than causing unequal weight on the teats as is common in the prior art where the nipples are arranged in a square pattern.

The interior of the bowl 12 is molded to accommodate and provide an extension of the downward swirling action of the milk. Thus, from the central boss 28 of the bowl there is a dam 48 which runs generally parallel to the outlet 46. The dam runs out to the outer wall of the bowl. Looking downwardly on the bowl, the area immediately to the right and in a clockwise direction from the area 50 is relatively shallow and the floor of the bowl sweeps downwardly in a spiral fashion as can be seen clearly in FIG. 2. Thus, the downwardly spiraling configuration of the bowl provides an increasing cross-sectional area accommodating the increasing volume of milk likely to be in the flow path as the outlet 46 is approached. The dam 48 deflects the milk from the low point into the outlet 46. The outlet is so low relative to the rest of the floor or bottom of the bowl that pooling is virtually precluded. The milk keeps moving continuously from the inlet down through the spiraling path on the interior wall of the cover and into the bowl which guides the milk over a further spiraling path into the outlet. The milk is kept in motion and kinetic energy is preserved. Therefore, the amount of energy (vacuum) necessary to be applied to the system is kept at a minimum.

Orientation of the inlet 44 relative to the outlet 46 is assured by providing the bowl with the upstanding key or lug 52 which engages the corresponding notch 54 in the frusto-conical cover to orient the parts. If other orientations of outlet to inlet were desired, as for example in the event it were desired to have the outlet directed to the side rather than to the rear of the cow, key or lug 52 could be omitted or relocated. It is thus much easier to change the orientation of the outlet with respect to the cow, and thereby to accommodate varying arrangements at the milking barn, with this claw than with previous designs.

The bowl is provided with a hanger bracket 56. The bowl is molded out of plastic. This makes it possible to obtain the downward spiraled flow path at reasonable cost. Preferably, the cover is clear plastic to allow observation of the milk.

Figure 1:
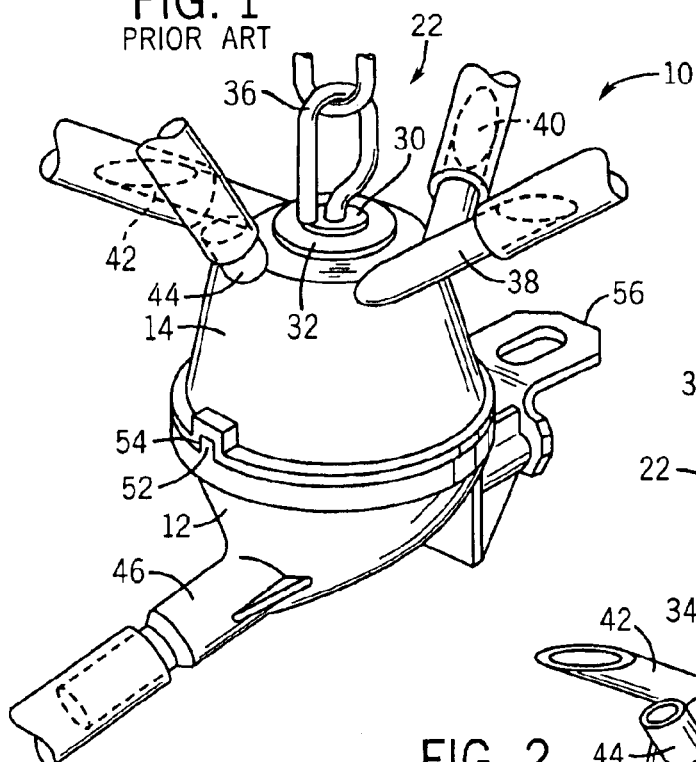
FIGS. 1–5 show prior art and are taken from U.S. Pat. No. 4,537,152, incorporated herein by reference.
Figure 2:
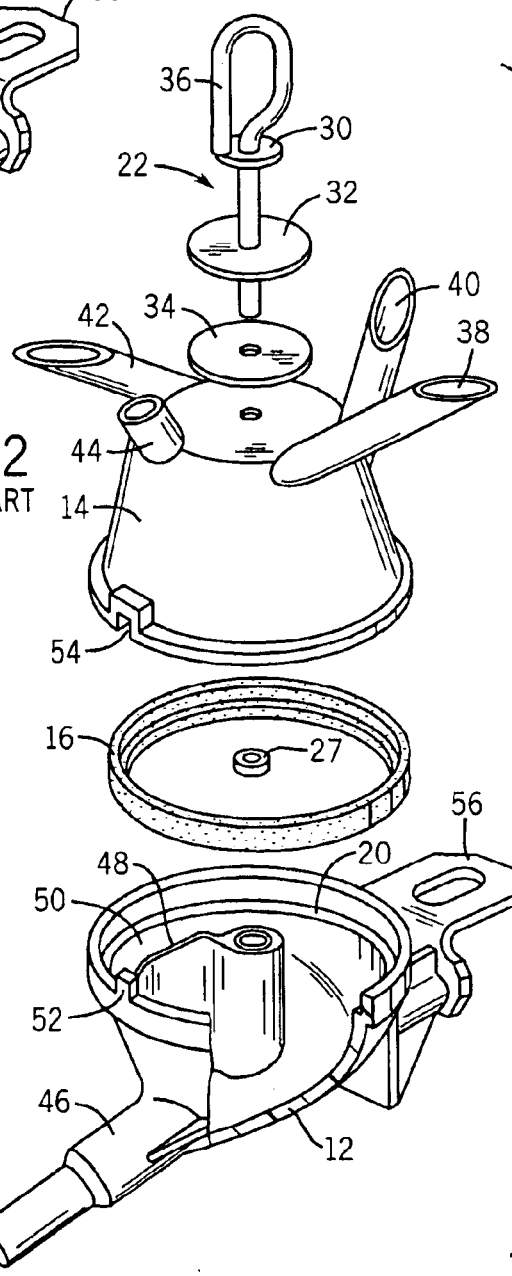
Figure 3:
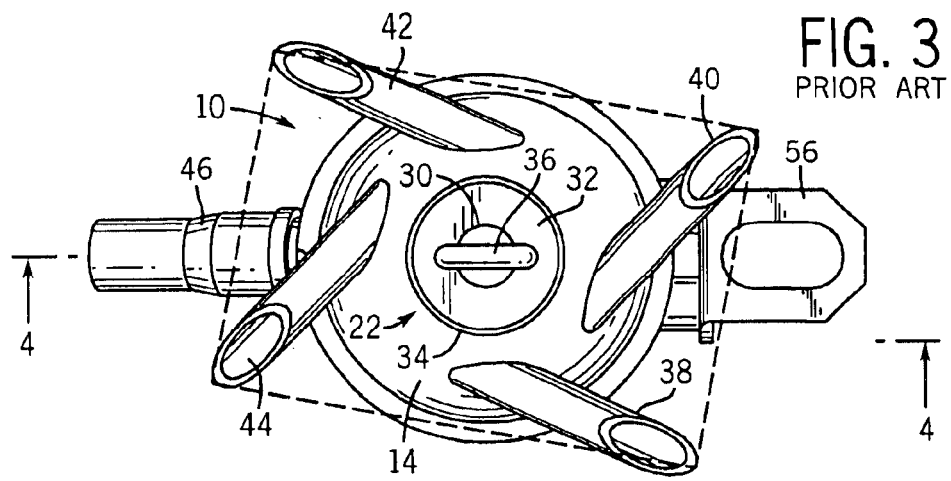
Figure 4:
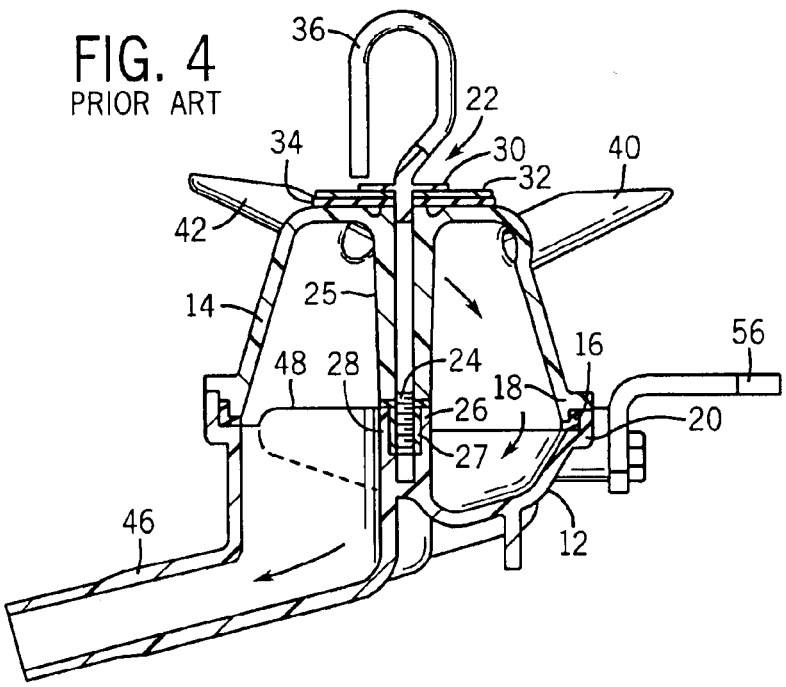
Figure 5:
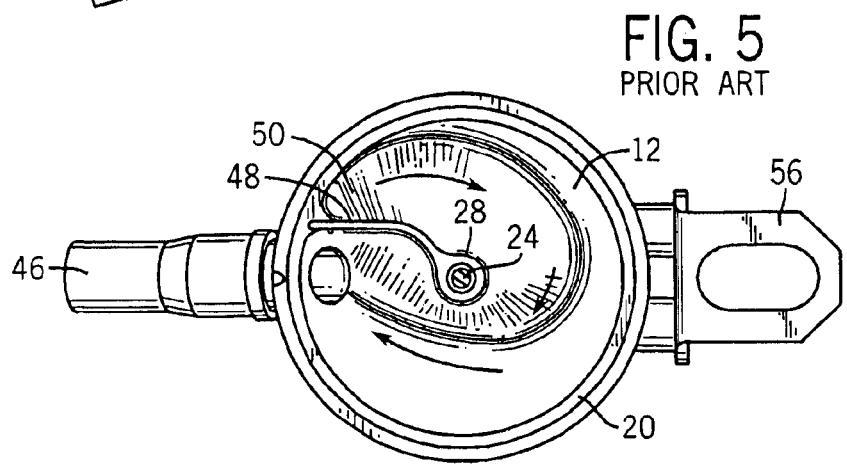
Figure 6:
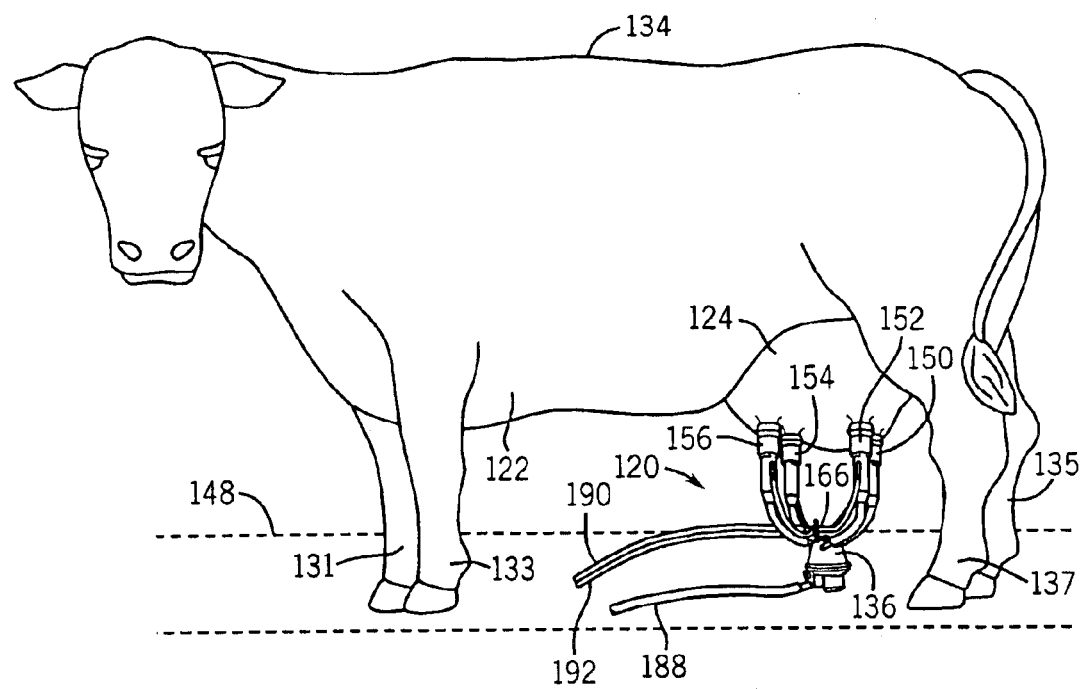
FIGS. 6 and 7 show prior art and are taken from U.S. Pat. No. 5,586,518, incorporated herein by reference.
Figure 7:
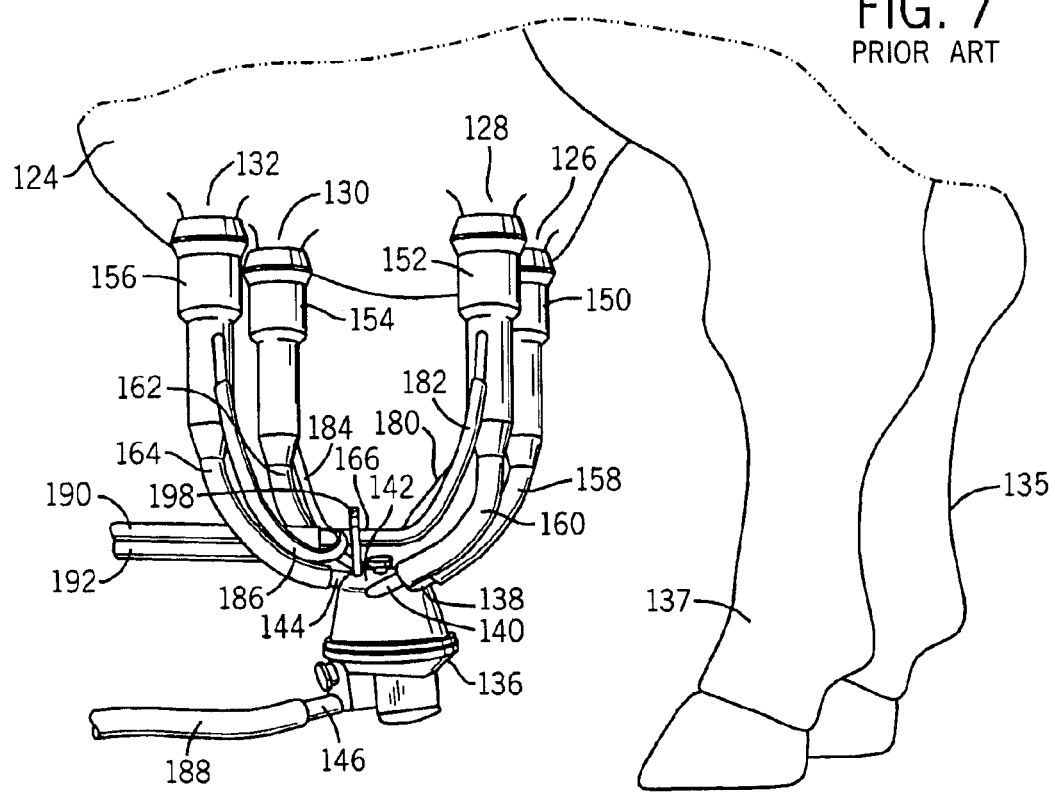

The following description of FIGS. 6 and 7 is taken from incorporated U.S. Pat. No. 5,586,518.

FIGS. 6 and 7 show a milking cluster 120 known in the prior art, and for which further reference may be had to U.S. Pat. Nos. 4,530,307, 4,537,152, 5,178,095, 5,218,924, incorporated herein by reference. Dairy animal 122, such as a cow, has an udder 124 and a plurality of teats 126, 128, 130, 132. The animal has a backbone 134 defining an axially extending longitudinal direction. A milking claw 136 has a plurality of inlets 138, 140, 142, 144, and an outlet 146. The claw lies along a central longitudinal axis 148 extending between the animal's front legs 131 and 133 and between the animal's rear legs 135 and 137 and generally parallel to backbone 134. Teat cups 150, 152, 154, 156 are each connected to a respective teat 126, 128, 130, 132 of udder 124. Short milk tubes 158, 160, 162, 164 each connect a respective claw inlet to a respective teat cup. An air fork 166, for which further reference may be had to the incorporated '518 patent, has one or more inlets connected to respective one or more vacuum pulsation air lines 190, 192, and has four outlets connected to respective air tubes 180, 182, 184, 186 each connected to a respective teat cup 150, 152, 154, 156. A milk hose 188 is connected to claw outlet 146. The claw has an upper eye hook at 198 for hanging the claw when not in use. In herringbone type and other conventional milking parlors, it is typical that milk hose 188 and air lines 190, 192 extend forwardly and then laterally to the side, though the milk hose and the air lines may extend longitudinally rearwardly along axis 148 between the cow's rear legs 135 and 137, or longitudinally forwardly along axis 148 between the cow's front legs 131 and 133.

The milking arrangement shown is of the alternating pulsation type. While vacuum is applied through air line 192, atmospheric air pressure is applied through air line 190, and vice versa. During the portion of the cycle when vacuum is applied through air line 192, such vacuum is applied through the fork to air tubes 180 and 182 to rear teat cups 150 and 152, such that rear teats 126 and 128 are in the milk phase, and milk flows from the rear teats through milk tubes 158 and 160 to claw inlets 138 and 140 for collection in claw 136 and discharge through outlet 146 and out through milk hose 188. Milk flows from the rear teats because vacuum is applied to the space between the rear teat cup shells and their respective teat cup liners or inflations such that the latter can relax and expand, as above noted, and all as is known in the prior art. During this portion of the cycle, atmospheric air pressure is applied by air line 190 through the fork to air tubes 184 and 186 to front teat cups 154 and 156 such that the front teats are in the rest phase. In this phase, the atmospheric air pressure in the space between the teat cup shells and their respective teat cup liners or inflations causes a differential pressure across the liner due to the vacuum on the inside thereof, which in turn collapses the liner, blocking milk flow, and also squeezing and massaging the teat to force blood circulation, as above noted, and all as is known in the prior art. It is typical that air lines 190 and 192 will be alternated between their opposite vacuum and atmospheric air pressure states at a pulsation rate between 45 and 60 cycles per minute.

Another type of pulsation system is the simultaneous or single shot type. In this type of system, the air fork has a singular inlet communicating with each of its four outlets connected respectively to air lines 180, 182, 184, 186, such that all four teat cups 150, 152, 154, 156 will be in either the milk phase or in the rest phase at the same time, and all as is known in the prior art.

Present Invention

FIGS. 8–18 illustrate the present invention. Milking claw 302 is provided for milking a dairy animal such as cow 122 having udder 124. The claw includes a claw top 304 and a claw bottom 306. Claw top 304 may be a standard top cover as known in the prior art, for example as shown in the above incorporated patents, or may be a novel claw top in combination, later described herein and which is the subject of commonly owned copending U.S. patent application Ser. No. 10/828,425, filed on even date herewith. Claw top 304 has at least one and preferably four inlets 308, 310, 312, 314 receiving milk from at least one and preferably four teats 132, 130, 128, 126, and directing incoming milk flow into the claw from the respective teat. Inlets 308, 310, 312, 314 are connected to milk tubes 164, 162, 160, 158 of respective teat cups 156, 154, 152, 150 for receiving milk from respective teats 132, 130, 128, 126.

Claw bottom 306 has an outlet 316 connected to milk hose 188 as above and subject to vacuum for drawing milk from the claw, as is known. Outlet 316 is a tubular member 318 extending from the claw bottom and having a flow passage 320, FIG. 11, of a first vertical height 322, and having a nozzle 324 with an opening 326 passing milk therethrough from the claw bottom to flow passage 320. Nozzle opening 326 has a second vertical height 328, FIG. 12, less than first vertical height 322. Because of this height differential, milk level in claw bottom 306 need only rise to the level 330 of the second lower vertical height 328 of nozzle 324 rather than to the level 332 of the first higher vertical height 322 of flow passage 320 of outlet tubular member 318 to provide a pressure differential between the vacuum in outlet 316 and the vacuum in the claw. The vacuum in the claw is less than the vacuum in outlet 316, i.e. the claw is at a higher relative pressure than outlet 316. The noted pressure differential is not established until the outlet is covered by milk in the claw bottom. The noted height differential enables the outlet to be covered sooner at lower level 330, rather than waiting for milk in the claw bottom to fill up to level 332. In turn, milk is drawn from the claw in smaller more frequent slugs as compared to higher volume less frequent slugs while otherwise waiting for milk level in the claw bottom to rise to level 332 of first vertical height 322. The shallow height 328 at level 330 creates a pressure differential at a lower fluid milk level than if nozzle 324 were not present. The pressure differential forces the milk out of the outlet 316 in smaller, more frequent slugs of milk. This more frequent taking away of the milk creates a more stable vacuum inside the claw, and reduces the amount of milk left in the claw at the end of milking. Furthermore, the bottom of the outlet is the lowest point 384 in the claw bottom, so milk is able to freely drain, which is an advantage over top-outlet claws. The outlet gravitationally drains the claw bottom, including in the absence of vacuum.

Flow passage 320 of outlet tubular member 318 has a first cross-sectional flow area. Nozzle opening 326 has a second cross-sectional flow area which is greater than or equal to the noted first cross-sectional flow area, so as not to increase restriction nor create an additional point of restriction compared with outlet flow passage 320. The noted second cross-sectional flow area is defined by second vertical height 328 and by a peripheral distance 334 along the nozzle opening which is substantially greater than vertical height 328. Milk in flow passage 320 flows along a flow axis 336. Nozzle opening 326 is a generally horizontally extending slot 338, FIGS. 11, 12, having first, second and third sections 340, 342, 344, respectively, FIG. 9, having a U-shape in top elevation view, with the bight of the U at 342 towards the rear, and the legs of the U at 340 and 344 extending forwardly from the bight. Second section 342 at the bight of the U is between first and third sections 340 and 344 which form the legs of the U. Second section 342 extends transversely of flow axis 336. First and third sections 340 and 344 extend longitudinally forwardly from second section 342 on laterally distally opposite sides of flow axis 336. First section 340 extends generally horizontally and parallel to flow axis 336 from a first open end 346, FIG. 12, to a second closed end 348. Second section 342 extends horizontally and transversely to flow axis 336 from a first open end 350 to a second open end 352. Third section 344 extends generally horizontally and parallel to flow axis 336 from a first open end 354 to a second closed end 356. First open end 346 of first section 340 merges with first open end 350 of second section 342 at a rounded corner of the bight of the U and provides a continuous nozzle opening slot thereat. First open end 354 of third section 344 merges with second open end 352 of second section 342 at the other rounded corner of the bight of the U and provides a continuous nozzle opening slot thereat. Slot 338 is a continuous extension from second closed end 348 of first section 340 to second closed end 356 of third section 344, namely extending from second closed end 348 of first section 340 then along first section 340 to first open end 342 of first section 340 then to first open end 350 of second section 342 then along second section 342 to second open end 352 of second section 342 then to first open end 354 of third section 344 then along third section 344 to second closed end 356 of third section 344. The width of the noted second cross-sectional flow area is the noted continuous extension along U-shape 340, 342, 344 of slot 338.

Claw bottom 306 has a sidewall 360, FIGS. 11, 13. Tubular member 318 of outlet 316 extends from sidewall 360 exteriorly from the claw bottom. The outlet further includes an awning 362 extending from sidewall 360 interiorly of the claw bottom and defining the noted slot providing nozzle opening 326. Awning 362 extends into the claw bottom along flow axis 336 to an inner awning tip 364, FIG. 12, spaced from sidewall 360. The awning has a pair of awning edges 366 and 368, FIGS. 9, 10, extending from sidewall 360 to inner awning tip 364. Awning edges 366 and 368 are on laterally distally opposite sides of flow axis 336. Slot 338 extends along inner awning tip 364 and along each of awning edges 366 and 368 in the noted U-shape.

Claw bottom 306 has an interior lower surface 370, FIGS. 13, 12. Awning edge 366 has a first bottom surface 372 spaced above lower interior surface 370 by a first gap 374. Inner awning tip 364 has a second bottom surface 376 spaced above lower interior surface 370 by a second gap 378. Awning edge 368 has a third bottom surface 380 spaced above lower interior surface 370 by a third gap 382. Each of first, second and third gaps 374, 378, 382 has a vertical height less than first vertical height 322, and preferably each equal to vertical height 328. First, second and third gaps 374, 378, 382 are horizontally continuous in the noted U-shape and define slot 338, i.e. the slot has a U-shape in a horizontal plane.

Awning tip 364 is spaced from lower interior surface 370 by the noted gap 378 providing nozzle opening 326. The claw bottom further has a recessed surface 384, FIGS. 11–13, below interior lower surface 370 and extending through sidewall 360 exteriorly of claw bottom 306 and into flow passage 320 of outlet tubular member 318. The noted nozzle opening 326 has a vertical height preferably equal to the noted second vertical height 328. The noted first vertical height 322 extends between upper and lower reaches at 386 and 388. Second vertical height 328 extends between upper and lower reaches 390 and 392. Upper reach 390 of second vertical height 328 is below upper reach 386 of first vertical height 322. Lower reach 392 of second vertical height 328 is above lower reach 388 of first vertical height 322.

Claw bottom 306 has distally opposite longitudinally spaced first and second front and rear ends 394 and 396, FIG. 8, along longitudinal axis 148. The claw bottom has a dividing wall dam 398, FIGS. 9–11, extending longitudinally along longitudinal axis 148 from one of the noted ends, preferably rear end 396, part way towards the other of the ends. Outlet 316 is at the noted other end, preferably front end 394, opposite end 396 and longitudinally spaced from dam 398 by a longitudinal gap 400 therebetween.

Tubular member 318 has an exterior section 402, FIG. 11, extending exteriorly of claw bottom 306, and an interior section 404 extending interiorly of the claw bottom. Interior section 404 defines the noted slot 338 providing nozzle opening 326. Interior section 404 has internal concavely curved and radiused portions 406, 408 facing flow passage 320 and extending from the slot to facilitate gentle flow of milk and to facilitate easier cleaning.

As noted above, claw bottom 306 may be used with a standard top cover 304 or may be used in combination with a novel claw top 204, FIGS. 14–18, which claw top 204 is the subject of commonly owned copending U.S. patent application Ser. No. 10/828,425, filed on even date herewith.

Milking claw 202, FIGS. 14–18, is provided for dairy animal 122 having the noted backbone 134 defining the noted axially extending longitudinal direction parallel to axis 148. Animal 122, such as a cow, has the noted four teats 126, 128, 130, 132 including a front pair of laterally spaced teats 130, 132 and a rear pair of laterally spaced teats 126, 128. Claw 202 has the noted claw bottom 206 and the noted claw top 204. Claw top 204 has four inlets 208, 210, 212, 214 connected to milk tubes 164, 162, 160, 158, respectively, and directing incoming milk flow into claw 202 respectively from teats 132, 130, 128, 126. Claw bottom 206 has an outlet 216 connected to milk hose 188 and subject to vacuum for drawing milk from the claw, as above described. Claw 202 lies along central longitudinal axis 148, FIGS. 6, 14, 15, which axis extends between the animal's legs and parallel to backbone 134. The inlets include a front pair of first and second inlets 208 and 210 laterally spaced on opposite sides of longitudinal axis 148 and receiving milk from front pair of teats 132 and 130 and directing such milk rearwardly into claw 202 on laterally opposite sides of longitudinal axis 148. The inlets include a rear pair of third and fourth inlets 212 and 214 laterally spaced on opposite sides of longitudinal axis 148 and receiving milk from the rear pair of teats 128 and 126 and directing such milk forwardly into claw 202 on laterally opposite sides of longitudinal axis 148.

Claw top 204 has first, second, third and fourth interior contoured surfaces 218, 220, 222, 224, FIGS. 17, 16, directing milk therealong from the first, second, third and fourth inlets 208, 210, 212, 214, respectively. First and third inlets 208 and 212 and first and third contoured surfaces 218 and 222 are on a first lateral side (e.g. the left side) of longitudinal axis 148. Second and fourth inlets 210 and 214 and second and fourth contoured surfaces 220 and 224 are on a second lateral side (e.g. the right side) of longitudinal axis 148 opposite the noted first lateral side. Milk entering claw 202 through first inlet 208 flows rearwardly along first contoured surface 218 on the noted first lateral side of longitudinal axis 148. Milk entering the claw through second inlet 210 flows rearwardly along second contoured surface 220 on the noted second lateral side of longitudinal axis 148. Milk entering the claw through third inlet 212 flows forwardly along third contoured surface 222 on the noted first lateral side of longitudinal axis 148. Milk entering the claw through fourth inlet 214 flows forwardly along fourth contoured surface 224 on the noted second lateral side of longitudinal axis 148. First and third contoured surfaces 218 and 222 are longitudinally spaced from each other such that milk flowing rearwardly along first contoured surface 218 does not impinge milk flowing forwardly along third contoured surface 222. Second and fourth contoured surfaces 220 and 224 are longitudinally spaced from each other such that milk flowing rearwardly along second contoured surface 220 does not impinge milk flowing forwardly along fourth contoured surface 224.

Claw top 204 has a first opening 226, FIG. 17, from which first inlet 208 extends forwardly. Claw top 204 has a second opening 228, FIGS. 16, 17, from which second inlet 210 extends forwardly. Claw top 204 has a third opening 230 from which third inlet 212 extends rearwardly. Claw top 204 has a fourth opening 232 from which fourth inlet 214 extends rearwardly. First and third openings 226 and 230 are on the noted first lateral side of longitudinal axis 148. Second and fourth openings 228 and 232 are on the noted second lateral side of longitudinal axis 148. First opening 226 is rearward of third opening 230. Second opening 228 is rearward of fourth opening 232. First and third openings 226 and 230 are spaced laterally from second and fourth openings 228 and 232 such that flow along the noted first lateral side along the top does not intersect flow along the noted second lateral side along the top.

Claw bottom 206 has longitudinally spaced front and rear ends 234 and 236, FIG. 14. First contoured surface 218 directs milk flow rearwardly and downwardly to rear end 236 of the claw bottom on the noted first lateral side of longitudinal axis 148. Second contoured surface 220 directs milk flow rearwardly and downwardly to rear end 236 of the claw bottom on the noted second lateral side of longitudinal axis 148. Third contoured surface 222 directs milk flow forwardly and downwardly to front end 234 of the claw bottom on the noted first lateral side of longitudinal axis 148. Fourth contoured surface 224 directs milk flow forwardly and downwardly to front end 234 of the claw bottom on the noted second lateral side of longitudinal axis 148.

Claw top 204 has longitudinally spaced front and rear ends 238 and 240, FIGS. 14–17. First contoured surface 218 has a leading end 242 at opening 226 of first inlet 208 and has a trailing end 244 at rear end 240 of claw top 204. Second contoured surface 220 has a leading end 246 at opening 228 of second inlet 210 and has a trailing end 248 at rear end 240 of claw top 204. Third contoured surface 222 has a leading end 250 at opening 230 of third inlet 212 and has a trailing end 252 at front end 238 of claw top 204. Fourth contoured surface 224 has a leading end 254 at opening 232 of fourth inlet 214 and has a trailing end 256 at front end 238 of claw top 204. Leading end 242 of first contoured surface 218 is rearward of leading end 250 of third contoured surface 222. Leading end 246 of second contoured surface 220 is rearward of leading end 254 of fourth contoured surface 222.

The noted first, second, third, fourth inlets 208, 210, 212, 214 have the noted first, second, third, fourth openings 226, 228, 230, 232, respectively, in claw top 204. Milk flows rearwardly into claw 202 at first opening 226 from first, left front, teat 132. Milk flows rearwardly into the claw at second opening 228 from second, right front, teat 130. Milk flows forwardly into the claw at third opening 230 from third, left rear, teat 128. Milk flows forwardly into the claw at fourth opening 232 from fourth, right rear, teat 126.

First, second, third, fourth inlets 208, 210, 212, 214 include first, second, third, fourth tubular members 258, 260, 262, 264, respectively. Tubular member 258 has an entry end 266 and a discharge end 268 and a tubular extension 270 therebetween. Tubular member 260 has an entry end 272 and a discharge end 274 and a tubular extension 276 therebetween. Tubular member 262 has an entry end 278 and a discharge end 280 and a tubular extension 282 therebetween. Tubular member 264 has an entry end 284 and a discharge end 286 and a tubular extension 288 therebetween. Tubular extensions 270 and 282 of first and third tubular members 258 and 262 longitudinally cross each other on the noted first lateral side of longitudinal axis 148, such that entry end 266 of first tubular member 258 is forward of entry end 278 of third tubular member 262, and such that discharge end 268 of first tubular member 258 is rearward of discharge end 280 of third tubular member 262. Tubular extensions 276 and 288 of second and fourth members 260 and 264 longitudinally cross each other on the noted second lateral side of longitudinal axis 148, such that entry end 272 of second tubular member 260 is forward of entry end 284 of fourth tubular member 264, and such that discharge end 274 of second tubular member 260 is rearward of discharge end 286 of fourth tubular member 264.

Milk from first teat 132 flows rearwardly through first tubular member 258 and is discharged rearwardly into claw 202 to flow rearwardly toward rear end 240 of claw top 204. Milk from second teat 130 flows rearwardly through second tubular member 260 and is discharged rearwardly into the claw to flow rearwardly rear end 240 of claw top 204. Milk from third teat 128 flows forwardly through third tubular member 262 and is discharged forwardly into the claw to flow forwardly toward front end 238 of claw top 204. Milk from fourth teat 126 flows forwardly through fourth tubular member 264 and is discharged forwardly into the claw to flow forwardly toward front end 238 of claw top 204. Discharge ends 268 and 280 of first and third tubular members 258 and 262 are on the noted first lateral side of longitudinal axis 148. Discharge ends 274 and 286 are on the noted second lateral side of longitudinal axis 148.

Milk flow from first tubular member 258 does not intersect milk flow from third tubular member 262 along claw top 204 because milk flows rearwardly from discharge end 268 of first tubular member 258 from a point rearward of discharge end 280 of third tubular member 262. Milk flow from second tubular member 260 does not intersect milk flow from fourth tubular member 264 along claw top 204 because milk flows rearwardly from discharge end 274 of second tubular member 260 from a point rearward of discharge end 286 of fourth tubular member 264. Milk flow from third tubular member 262 does not intersect milk flow from first tubular member 258 along claw top 204 because milk flows forwardly from discharge end 280 of third tubular member 262 from a point forward of discharge end 268 of first tubular member 258. Milk flow from fourth tubular member 264 does not intersect milk flow from second tubular member 260 along claw top 204 because milk flows forwardly from discharge end 286 of fourth tubular member 264 from a point forward of discharge end 274 of second tubular member 260.

Claw top 204 and claw bottom 306 are mounted to each other, FIGS. 14, 18 in conventional manner by a central shank bolt 410 which may be threaded and/or trapped at either or both of its top and bottom ends and retained by a nut 412 or the like retaining horizontal flange 414 of hook 198 against a compression gasket 416 compressively bearing against claw top 204. Claw bottom 306 may have a rubber bumper 418 attached thereto. Inner and outer annular sealing gaskets 420 and 422 are provided between claw top 204 and claw bottom 306.

In a desirable aspect, inlets 208 and 212 at their respective tubular extensions 258 and 262, FIG. 15, pass by each other before entering the claw, and claw inlets 210 and 214 at their respective tubular extensions 260 and 264 pass by each other before entering the claw. In this manner, the front inlet milk flow paths do not intersect the rear inlet milk flow paths, which in turn reduces agitation and degradation of the milk. Contours along the interior surface of the claw top, and preferably also in the mating claw bottom, gently direct the milk flow paths toward outlet flow passage 320. The milk follows the interior walls of the claw, rather than splashing on a lower surface or into a puddle after a free-fall from a height. Rather than splashing against a nearly right angle surface or puddle of milk, the milk flow from the inlets clings to nearly tangential contours along the interior surface of the claw top and also preferably along the mating claw bottom and is guided toward the outlet flow passage 320. The milk flow paths from inlets 212 and 214 are directed toward outlet 316, and the milk flow paths from inlets 208 and 210 are directed toward the rear ends 240, 396 of the claw on opposite sides of dam wall 398 and change direction to flow back forwardly toward outlet 316, all with minimum intermingling and resultant agitation. The noted crossing of the inlets above the claw provides the noted desirable flow paths minimizing splashing within the claw which would otherwise agitate the milk and break down the fatty globules in the milk which otherwise causes degradation. When using the above noted alternating pulsation, the inlet orientations prevent back-jetting or cross-jetting of bacteria-laden milk in the form of aerosols to a diagonally opposite inlet because of the drastic change of direction required for same. For example, cross-jetting from inlet 208 at opening 226 to inlet 214 at opening 232, or vice versa, requires a turn of more than 90° to an opposite direction. Likewise, cross-jetting from inlet 210 and opening 228 to inlet 212 at opening 230, or vice versa, requires a turn and directional change of more than 90° to an opposite direction. The wider lateral spacing of inlets 208 and 210 at respective entry ends 266 and 272 is desirable to accommodate the wider spacing of a cow's front teats. Likewise, the narrower lateral spacing of inlets 212 and 214 at respective entry ends 278 and 284 is desirable to accommodate the smaller lateral spacing of the cow's rear teats. The interior of the claw maintains separate milk flow paths from each of the respective four teats as the milk flow adheres to the interior surface of the top cover and lower bowl until the milk flow reaches the bottom of the bowl at a reduced flow rate and with reduced agitation, whereat the milk flow paths commingle and merge and exit through flow passage 320.

In the disclosed embodiments, milk hose 188, FIGS. 6, 7, is routed toward the front of the dairy animal, and outlets 46, 146, 216, 316 point toward the front of the dairy animal. Alternatively, claw bottom 206, 306 may be rotated 180° about a vertical axis such that the milk hose is routed toward the rear of the dairy animal, and outlets 216, 316 point toward the rear of the dairy animal, or further alternatively, claw bottom 206, 306 may be rotated 90° about a vertical axis such that the milk hose is routed toward the side of the dairy animal, and outlets 216, 316 point toward the side of the dairy animal. In these latter embodiments, the claw top preferably remains in the orientation shown, with inlets 208, 210 pointing toward the front of the dairy animal for connection to the front pair of laterally spaced teats, and with inlets 212, 214 pointing toward the rear of the dairy animal for connection to the rear pair of laterally spaced teats.

The noted first opening 226, FIG. 17, in claw top 204 introduces milk flow into the claw along a first rearwardly directed milk flow path at 218 traversing rearwardly of third opening 230. It is preferred that opening 226 be rearward of or at least laterally adjacent to opening 230, but not forward of opening 230. Second opening 228 introduces milk flow into the claw along a second rearwardly directed milk flow path at 220 traversing rearwardly of fourth opening 232. It is preferred that opening 228 be rearward of or at least laterally adjacent to opening 230, but not forward of opening 232. Third opening 230 introduces milk flow into the claw along a third forwardly directed milk flow path at 222 traversing forwardly of first opening 226. It is preferred that opening 230 be forward of opening 226 or at least laterally adjacent thereto, but not rearward of opening 226. Fourth opening 232 introduces milk flow into the claw along a fourth forwardly directed milk flow path at 224 traversing forwardly of opening 228. It is preferred that opening 232 be forward of opening 228 or at least adjacent thereto, but not rearward of opening 228. The noted first and third milk flow paths at 218 and 222 are nonintersecting such that milk flowing from first opening 226 along the milk flow path at 218 does not intersect milk flowing from the third opening 230 along the third milk flow path at 222. The noted second and fourth milk flow paths at 220 and 224 are nonintersecting such that milk flowing from the second opening 228 along the second milk flow path at 220 does not intersect milk flowing from the fourth opening 232 along the fourth milk flow path at 224. In the preferred embodiment, as noted, first opening 226 is rearward of third opening 230, and second opening 228 is rearward of fourth opening 232. First and third openings 226 and 230 have respective leading portions 432 and 434 laterally adjacent each other. Second and fourth openings 228 and 232 have respective leading portions 436 and 438 laterally adjacent each other. First and third openings 226 and 230 have respective trailing portions 440 and 442 longitudinally spaced from each other. Second and fourth openings 228 and 232 have respective trailing portions 446 and 448 longitudinally spaced from each other.

The noted first, second, third, fourth contoured surfaces 218, 220, 222, 232, FIG. 17, terminate substantially tangentially to respective mating surfaces 450, 452, 454, 456, FIG. 10, of claw bottom 306 such that milk is delivered to the claw bottom with minimal splashing. First, second, third, fourth contoured surfaces, 218, 220, 222, 232 are initially substantially tangential to the noted first, second, third, fourth milk flow paths from respective openings 226, 228, 230, 232 of respective inlets 208, 210, 212, 214, and then contour and curve downwardly to mate with and direct milk flow substantially tangentially to the noted respective mating surfaces 450, 452, 454, 456 of the claw bottom. The upper interior surface of claw top 204 includes a rearward separational surface 458 in the form of a flat planar surface extending longitudinally along axis 148 and laterally between channeled or grooved contoured surfaces 218 and 220, or in the form of a longitudinally extending hump or dome along axis 148 and extending out of the page as viewed in FIG. 17. Separational surface 458 is laterally between first and second contoured surfaces 218 and 220 and provides a rearward separational director therebetween which directs milk flow from first inlet 208 along first contoured surface 218 and away from second contoured surface 220, and which directs milk flow from second inlet 210 along second contoured surface 220 and away from first contoured surface 218. The upper interior surface of claw top 204 further includes a forward separational surface 460 in the form of a flat planar surface extending longitudinally along axis 148 and laterally between channeled or grooved contoured surfaces 222 and 224, or in the form of a hump or dome extending longitudinally along axis 148 and out of the page as viewed in FIG. 17. Separational surface 460 is laterally between third and fourth contoured surfaces 222 and 224 and provides a forward separational director therebetween which directs milk flow from third inlet 212 at opening 230 along third contoured surface 222 and away from fourth contoured surface 224, and which directs milk flow from fourth inlet 214 at opening 232 along fourth contoured surface 224 and away from third contoured surface 222.

The noted first and third tubular members 258 and 262, FIGS. 14, 15, cross each other at a first crossing zone, and in a preferred construction these members are structurally connected at such crossing zone by member 462. Second and fourth tubular members 260 and 264 cross each other at a second crossing zone, and in a preferred construction these members are structurally connected at such crossing zone by member 464. A first brace 466 further structurally connects and bridges between first and third tubular members 258 and 262 at the first crossing zone. A second brace 468 further structurally connects and bridges between second and fourth tubular members 260 and 264 at the second crossing zone.

Claw bottom 306 has lower interior surfaces 472, 474, FIG. 10, sloped from areas 476, 478 adjacent dividing wall dam 398 towards the outlet to promote drainage to the outlet. Interior surfaces 472, 474 are shaped to form a path for milk to flow from areas 476, 478 adjacent dividing wall dam 398 towards outlet 316. Inlets 208, 210 supply milk to rearward end 396 of claw bottom 306. Inlets 212, 214 supply milk to forward end 394 of claw bottom 306. Interior surfaces 472, 474 are preferably shaped to form paths for milk to travel from areas 476, 478 adjacent dividing wall dam 398 towards outlet 316 without intersecting flow from inlets 212, 214 directed toward forward end 394 until the milk is adjacent outlet 316 at nozzle opening 326. Claw bottom 306 has the noted interior contoured surfaces 450, 452, 454, 456 tangentially receiving milk flow from respective contoured surfaces 218, 220, 222, 224 of claw top 204. The lower interior surfaces are sloped from distal areas towards the outlet to promote drainage to the outlet.

It is recognized that various equivalents, alternatives and modifications are possible within the scope of the appended claims.

What is claimed is:

1. A milking claw for a dairy animal having an udder having at least one teat, said claw having a top having at least one inlet directing incoming milk flow into said claw respectively from said at least one teat, said claw having a bottom having an outlet subject to vacuum for drawing milk therefrom, said outlet comprising a tubular member extending laterally from said claw bottom and having a flow passage of a first vertical height, a nozzle having an opening passing milk therethrough from said claw bottom to said flow passage, said nozzle opening having a second vertical height less than said first vertical height, such that milk level in said claw bottom need only rise to the level of the second lower vertical height of said nozzle opening rather than to the level of the first higher vertical height of said flow passage of said outlet tubular member, to provide a pressure differential between the vacuum in said outlet and the vacuum in said claw, whereby to draw milk from said claw in smaller more frequent slugs as compared to higher volume less frequent slugs while otherwise waiting for milk level in said claw bottom to rise to the level of said first vertical height.

2. The milking claw according to claim 1 wherein said outlet gravitationally drains said claw bottom, including in the absence of said vacuum.

3. The milking claw according to claim 1 wherein said flow passage of said outlet tubular member has a first cross-sectional flow area, and said nozzle opening has a second cross-sectional flow area, and wherein said second cross-sectional flow area is greater than or equal to said first cross-sectional flow area.

4. The milking claw according to claim 3 wherein said second cross-sectional flow area is defined by said second vertical height and by a lateral width substantially greater than said second vertical height.

5. The milking claw according to claim 4 wherein milk in said flow passage flows along a flow axis, and wherein said nozzle opening comprises a generally horizontally extending slot comprising first, second and third sections, said second section being between said first and third sections, said second section extending transversely of said flow axis, said first and third sections extending from said second section on laterally distally opposite sides of said flow axis.

6. The milking claw according to claim 5 wherein:
said first section extends generally horizontally and parallel to said flow axis from a first end to a second end;
said second section extends generally horizontally and transversely to said flow axis from a first end to a second end;
said third section extends generally horizontally and parallel to said flow axis from a first end to a second end;
said width of said second cross-sectional flow area is the cumulative extension of said slot along said first, second and third sections.

7. The milking claw according to claim 6 wherein:
said first end of said first section is an open end;
said second end of said first section is a closed end;
said first end of said second section is an open end;
said second end of said second section is an open end;
said first end of said third section is an open end;
said second end of said third section is a closed end;
said first open end of said first section merges with said first open end of said second section and provides a continuous nozzle opening slot thereat;
said first open end of said third section merges with said second open end of said second section and provides a continuous nozzle opening slot thereat;
said slot is a continuous extension from said second closed end of said first section to said second closed end of said third section, namely extending from said second closed end of said first section then along said first section to said first open end of said first section then to said first open end of said second section then along said second section to said second open end of said second section then to said first open end of said third section then along said third section to said second closed end of said third section;
said width of said second cross-sectional flow area is said continuous extension of said slot.

8. The milking claw according to claim 3 wherein:
said claw bottom has a sidewall;
said tubular member of said outlet extends from said sidewall exteriorly from said claw bottom;
said outlet further comprises an awning extending from said sidewall interiorly of said claw bottom and defining a slot providing said nozzle opening.

9. The milking claw according to claim 8 wherein:
milk in said flow passage flows along a flow axis;
said awning extends into said claw bottom along said flow axis to an inner awning tip spaced from said sidewall;
said awning has a pair of awning edges extending from said sidewall to said inner awning tip, said awning edges being on laterally distally opposite sides of said flow axis;
said slot extends along said inner awning tip and along each of said awning edges.

10. The milking claw according to claim 9 wherein:
said claw bottom has an interior lower surface;
a first of said awning edges has a first bottom surface spaced above said lower interior surface of said claw bottom by a first gap;
said inner awning tip has a second bottom surface spaced above said lower interior surface of said claw bottom by a second gap;
a second of said awning edges has a third bottom surface spaced above said lower interior surface of said claw bottom by a third gap;
each of said first, second and third gaps has a vertical height less than said first vertical height.

11. The milking claw according to claim 10 wherein said first, second and third gaps are horizontally continuous and define said slot.

12. The milking claw according to claim 11 wherein said slot has a U-shape in a horizontal plane.

13. The milking claw according to claim 1 wherein:
said claw bottom has a sidewall and an interior lower surface;
said sidewall has a section with a tip spaced from said interior lower surface by a gap providing said nozzle opening;
said claw bottom has a recessed surface below said interior lower surface and extending through said sidewall exteriorly of said claw bottom and into said flow passage of said outlet tubular member.

14. The milking claw according to claim 13 wherein said gap has a vertical height equal to said second vertical height.

15. The milking claw according to claim 14 wherein:
said first vertical height extends between upper and lower reaches;
said second vertical height extends between upper and lower reaches;
said upper reach of said second vertical height is below said upper reach of said first vertical height;
said lower reach of said second vertical height is above said lower reach of said first vertical height.

16. The milking claw according to claim 1 wherein said claw bottom has distally opposite first and second ends defining a longitudinal axis therebetween, and comprising a dividing wall dam extending longitudinally along said longitudinal axis from one of said ends part way towards the other of said ends, and wherein said outlet is at said other of said ends opposite said one end and longitudinally spaced from said dam by a longitudinal gap therebetween.

17. The milking claw according to claim 16 wherein said claw bottom has lower interior surfaces sloped from areas adjacent said dividing wall dam towards said outlet to promote drainage to said outlet.

18. The milking claw according to claim 16 wherein said claw bottom has interior surfaces shaped to form a path for milk to flow from areas adjacent said dividing wall dam towards said outlet.

19. The milking claw according to claim 16 wherein said claw top has a plurality of said inlets, including one inlet supplying milk to said one end of said claw bottom, and another inlet supplying milk to said other end of said claw bottom, and wherein said claw bottom has interior surfaces shaped to form a path for milk to travel from areas adjacent said dividing wall dam towards said outlet without intersecting flow from said other of said inlets until the milk is adjacent said outlet.

20. The milking claw according to claim 1 wherein said claw bottom has interior contoured surfaces tangentially receiving milk flow from said claw top.

21. The milking claw according to claim 1 wherein said tubular member has an exterior section extending exteriorly of said claw bottom, and an interior section extending interiorly of said claw bottom, said interior section defining a slot providing said nozzle opening, said interior section having concavely curved and radiused portions facing said flow passage and extending from said slot to facilitate gentle flow of milk and to facilitate easier cleaning.

22. The milking claw according to claim 1 wherein said claw bottom has lower interior surfaces sloped from distal areas towards said outlet to promote drainage to said outlet.

23. A milking claw for a dairy animal having a backbone defining an axially extending longitudinal direction, and an udder having four teats comprising a front pair of laterally spaced teats and a rear pair of laterally spaced teats, said claw having a top having four inlets directing incoming milk flow into said claw respectively from said four teats, said claw having a bottom having an outlet subject to vacuum for drawing milk therefrom, said claw lying along a central longitudinal axis extending between the animal's legs and generally parallel to said backbone, said inlets comprising a front pair of first and second inlets laterally spaced on opposite sides of said longitudinal axis and receiving milk from said front pair of teats and directing such milk rearwardly into said claw on laterally opposite sides of said longitudinal axis, and a rear pair of third and fourth inlets laterally spaced on opposite sides of said longitudinal axis and receiving milk from said rear pair of teats and directing such milk forwardly into said claw on laterally opposite sides of said longitudinal axis, said outlet comprising a tubular member extending laterally from said claw bottom and having a flow passage of a first vertical height, a nozzle having an opening passing milk therethrough from said claw bottom to said flow passage, said nozzle opening having a second vertical height less than said first vertical height, such that milk level in said claw bottom need only rise to the level of the second lower vertical height of said nozzle opening rather than to the level of the first higher vertical height of said flow passage of said outlet tubular member, to provide a pressure differential between the vacuum in said outlet and the vacuum in said claw, whereby to draw milk from said claw in smaller more frequent slugs as compared to higher volume less frequent slugs while otherwise waiting for milk level in said claw bottom to rise to the level of said first vertical height.

24. The milking claw according to claim 23 wherein:
said claw top has a first opening from which said first inlet extends forwardly;
said claw top has a second opening from which said second inlet extends forwardly;
said claw top has a third opening from which said third inlet extends rearwardly;
said claw top has a fourth opening from which said fourth inlet extends rearwardly;
said first and third openings are on a first lateral side of said longitudinal axis;
said second and fourth openings are on a second lateral side of said longitudinal axis;
said first opening introduces milk flow into said claw along a first rearwardly directed milk flow path traversing rearwardly of said third opening;
said second opening introduces milk flow into said claw along a second rearwardly directed milk flow path traversing rearwardly of said fourth opening;
said third opening introduces milk flow into said claw along a third forwardly directed milk flow path traversing forwardly of said first opening;
said fourth opening introduces milk flow into said claw along a fourth forwardly directed milk flow path traversing forwardly of said second opening;
said first and third milk flow paths are nonintersecting such that milk flowing from said first opening along said first milk flow path does not intersect milk flowing from said third opening along said third milk flow path;
said second and fourth milk flow paths are nonintersecting such that milk flowing from said second opening along said second milk flow path does not intersect milk flowing from said fourth opening along said fourth milk flow path.

25. The milking claw according to claim 24 wherein:
said first opening is rearward of said third opening;
said second opening is rearward of said fourth opening.

26. The milking claw according to claim 24 wherein said first and third openings have leading portions laterally adjacent each other, and said second and fourth openings have leading portions laterally adjacent each other.

27. The milking claw according to claim 24 wherein said first and third openings have trailing portions longitudinally spaced from each other, and said second and fourth openings have trailing portions longitudinally spaced from each other.

28. The milking claw according to claim 23 wherein:
said claw top has first, second, third and fourth interior contoured surfaces respectively directing milk therealong from said first, second, third and fourth inlets;
said first and third inlets and said first and third contoured surfaces are on a first lateral side of said longitudinal axis;
said second and fourth inlets and said second and fourth contoured surfaces are on a second lateral side of said longitudinal axis opposite said first lateral side;
milk entering said claw through said first inlet flows rearwardly along said first contoured surface on said first lateral side of said longitudinal axis;
milk entering said claw through said second inlet flows rearwardly along said second contoured surface on said second lateral side of said longitudinal axis;
milk entering said claw through said third inlet flows forwardly along said third contoured surface on said first lateral side of said longitudinal axis;
milk entering said claw through said fourth inlet flows forwardly along said fourth contoured surface on said second lateral side of said longitudinal axis;
said first and third contoured surfaces are longitudinally spaced from each other such that milk flowing rearwardly along said first contoured surface does not impinge milk flowing forwardly along said third contoured surface;
said second and fourth contoured surfaces are longitudinally spaced from each other such that milk flowing rearwardly along said second contoured surface does not impinge milk flowing forwardly along said fourth contoured surface.

29. The milking claw according to claim 28 wherein said claw bottom has longitudinally spaced front and rear ends;
said first contoured surface directs milk flow rearwardly and downwardly to said rear end of said claw bottom on said first lateral side of said longitudinal axis;
said second contoured surface directs milk flow rearwardly and downwardly to said rear end of said claw bottom on said second lateral side of said longitudinal axis;
said third contoured surface directs milk flow forwardly and downwardly to said front end of said claw bottom on said first lateral side of said longitudinal axis;
said fourth contoured surface directs milk flow forwardly and downwardly to said front end of said claw bottom on said second lateral side of said longitudinal axis.

30. The milking claw according to claim 29 wherein said first, second, third and fourth contoured surfaces terminate substantially tangentially to respective mating surfaces of said claw bottom such that milk is delivered to said claw bottom with minimal splashing.

31. The milking claw according to claim 28 wherein said first, second, third and fourth contoured surfaces are initially substantially tangential to said first, second, third and fourth milk flow paths, respectively, from said first, second, third and fourth inlets, respectively.

32. The milking claw according to claim 28 wherein:

said claw top has longitudinally spaced front and rear ends;

said first contoured surface has a leading end at said first inlet and has a trailing end at said rear end of said claw top;

said second contoured surface has a leading end at said second inlet and has a trailing end at said rear end of said claw top;

said third contoured surface has a leading end at said third inlet and has a trailing end at said front end of said claw top;

said fourth contoured surface has a leading end at said fourth inlet and has a trailing end at said front end of said claw top;

said leading end of said first contoured surface is rearward of said leading end of said third contoured surface;

said leading end of said second contoured surface is rearward of said leading end of said fourth contoured surface.

33. The milking claw according to claim 28 wherein said first contoured surface is spaced laterally from said second contoured surface to separate the flow from said first inlet from the flow from said second inlet, and said third contoured surface is spaced laterally from said fourth contoured surface to separate the flow from said third inlet from the flow from said fourth inlet.

34. The milking claw according to claim 28 comprising:

a rearward separational surface laterally between said first and second contoured surfaces and providing a rearward separational director therebetween, said rearward separational director directing milk flow from said first inlet along said first contoured surface and away from said second contoured surface, said rearward separational director directing milk flow from said second inlet along said second contoured surface and away from said first contoured surface;

a forward separational surface laterally between said third and fourth contoured surfaces and providing a forward separational director therebetween, said forward separational director directing milk flow from said third inlet along said third contoured surface and away from said fourth contoured surface, said forward separational director directing milk flow from said fourth inlet along said fourth contoured surface and away from said third contoured surface.

35. The milking claw according to claim 23 wherein:

said first, second, third and fourth inlets comprise first, second, third and fourth tubular members, respectively, each tubular member having an entry end and a discharge end and a tubular extension therebetween;

said tubular extensions of said first and third tubular members longitudinally cross each other on a first lateral side of said longitudinal axis;

said tubular extensions of said second and fourth tubular members longitudinally cross each other on a second lateral side of said longitudinal axis, said second lateral side being opposite to said first lateral side.

36. The milking claw according to claim 35 wherein:

said entry end of said first tubular member is forward of said entry end of said third tubular member;

said discharge end of said first tubular member is rearward of said discharge end of said third tubular member;

said entry end of said second tubular member is forward of said entry end of said fourth tubular member;

said discharge end of said second tubular member is rearward of said discharge end of said fourth tubular member.

37. The milking claw according to claim 35 wherein:

said claw top has longitudinally spaced front and rear ends;

milk from said first teat flows rearwardly through said first tubular member and is discharged rearwardly into said claw to flow rearwardly toward said rear end of said claw top;

milk from said second teat flows rearwardly through said second tubular member and is discharged rearwardly into said claw to flow rearwardly toward said rear end of said claw top;

milk from said third teat flows forwardly through said third tubular member and is discharged forwardly into said claw to flow forwardly toward said front end of said claw top;

milk from said fourth teat flows forwardly through said fourth tubular member and is discharged forwardly into said claw to flow forwardly toward said front end of said claw top;

said discharge ends of said first and third tubular members are on a first lateral side of said longitudinal axis;

said discharge ends of said second and third tubular members are on a second lateral side of said longitudinal axis, said second lateral side being opposite to said first lateral side;

milk flow from said first tubular member does not intersect milk flow from said third tubular member along said claw top because milk flows rearwardly from said discharge end of said first tubular member from a point rearward of said discharge end of said third tubular member;

milk flow from said second tubular member does not intersect milk flow from said fourth tubular member along said claw top because milk flows rearwardly from the discharge end of said second tubular member from a point rearward of said discharge end of said fourth tubular member;

milk flow from said third tubular member does not intersect milk flow from said first tubular member along said claw top because milk flows forwardly from said discharge end of said third tubular member from a point forward of said discharge end of said first tubular member;

milk flow from said fourth tubular member does not intersect milk flow from said second tubular member along said claw top because milk flows forwardly from said discharge end of said fourth tubular member from a point forward of said discharge end of said second tubular member.

38. The milking claw according to claim 35 wherein:

said first and third tubular members cross each other at a first crossing zone;

said second and fourth tubular members cross each other at a second crossing zone;

and comprising:

a first structural connection member between said first and third tubular members at said first crossing zone;

a second structural connection member between said second and fourth tubular members at said second crossing zone.

* * * * *